United States Patent
Fabris (10) Patent No.: US 11,590,794 B2
(45) Date of Patent: Feb. 28, 2023

(54) BICYCLE WHEEL COMPONENT WITH BRAKING AREA MADE OF COMPOSITE MATERIAL AND RELATED MANUFACTURING PROCESS

(71) Applicant: Campagnolo S.r.l., Vicenza (IT)

(72) Inventor: Paolo Fabris, Brendola (IT)

(73) Assignee: Campagnolo S.r.l., Vicenza (IT)

( * ) Notice: Subject to any disclaimer, the term of this patent is extended or adjusted under 35 U.S.C. 154(b) by 923 days.

(21) Appl. No.: 16/447,307

(22) Filed: Jun. 20, 2019

(65) Prior Publication Data

US 2019/0299704 A1    Oct. 3, 2019

Related U.S. Application Data

(62) Division of application No. 15/287,340, filed on Oct. 6, 2016, now Pat. No. 10,369,838.

(30) Foreign Application Priority Data

Oct. 7, 2015   (IT) ............................ UB2015A004195

(51) Int. Cl.
  *B60B 5/02*   (2006.01)
  *B60B 1/00*   (2006.01)
  (Continued)

(52) U.S. Cl.
  CPC .............. *B60B 5/02* (2013.01); *B23K 26/402* (2013.01); *B29C 69/001* (2013.01); *B60B 1/00* (2013.01);
  (Continued)

(58) Field of Classification Search
  CPC .... B60B 1/00; B60B 1/06; B60B 5/02; B60B 21/00; B60B 21/08; B60B 2900/115; B23K 26/402; B29C 69/001
  See application file for complete search history.

(56) References Cited

U.S. PATENT DOCUMENTS

| 3,433,327 | A |   | 3/1969 | Regis |
| 3,732,951 | A | * | 5/1973 | Hata .................... B62L 1/10 |
|           |   |   |        | 301/95.101 |
| 6,065,812 | A | * | 5/2000 | Lee ..................... B62L 1/005 |
|           |   |   |        | 301/95.101 |
| 6,216,758 | B1|   | 4/2001 | Chen |
| 6,273,518 | B1| * | 8/2001 | Chen ................... B60B 21/08 |
|           |   |   |        | 301/95.101 |

(Continued)

FOREIGN PATENT DOCUMENTS

| CN | 201109342 Y | 9/2008 |
| DE | 202007007997 U1 | 8/2007 |

(Continued)

OTHER PUBLICATIONS

Japanese Office Action for Application No. 2016-197611, dated Sep. 15, 2020 with English translation.

(Continued)

*Primary Examiner* — S. Joseph Morano
*Assistant Examiner* — Emily G. Castonguay
(74) *Attorney, Agent, or Firm* — Volpe Koenig (57) ABSTRACT

A process for manufacturing a bicycle wheel component, comprising the steps of providing a component having at least one braking area that cooperates with a braking body made by molding of composite material having structural fibers in a polymeric material, and post-molding machining of at least one region of the braking area by removing only polymeric material, without removal of the structural fiber, from the entire region so that the structural fiber outcrops at least in part from the polymeric material, and removing the structural fiber and possibly the polymeric material according to at least one groove within the region. A bicycle wheel component having a braking area of composite material, wherein in a region of the braking area, the structural fiber outcrops at least from the polymeric material, and the region (Continued)

comprises a groove through the structural fiber and possibly the polymeric material of the composite material.

11 Claims, 9 Drawing Sheets

(51) Int. Cl.
- *B60B 21/00* (2006.01)
- *B60B 21/08* (2006.01)
- *B23K 26/402* (2014.01)
- *B29C 69/00* (2006.01)
- B23K 103/16 (2006.01)
- B60B 1/02 (2006.01)
- B60B 1/06 (2006.01)
- B23K 103/00 (2006.01)
- B29K 105/08 (2006.01)
- B29K 307/04 (2006.01)
- B29L 31/30 (2006.01)
- B29L 31/32 (2006.01)
- B60B 3/00 (2006.01)
- B62L 1/10 (2006.01)

(52) U.S. Cl.
CPC ............... *B60B 21/00* (2013.01); *B60B 21/08* (2013.01); *B23K 2103/172* (2018.08); *B23K 2103/50* (2018.08); *B29K 2105/08* (2013.01); *B29K 2307/04* (2013.01); *B29L 2031/3091* (2013.01); *B29L 2031/32* (2013.01); *B60B 1/003* (2013.01); *B60B 1/02* (2013.01); *B60B 1/06* (2013.01); *B60B 3/00* (2013.01); *B60B 2310/204* (2013.01); *B60B 2310/228* (2013.01); *B60B 2310/60* (2013.01); *B60B 2360/341* (2013.01); *B60B 2900/115* (2013.01); *B60B 2900/131* (2013.01); *B60B 2900/133* (2013.01); *B60B 2900/325* (2013.01); *B60Y 2200/13* (2013.01); *B62L 1/10* (2013.01)

(56) References Cited

U.S. PATENT DOCUMENTS

| | | | |
|---|---|---|---|
| 9,242,421 B2 | 1/2016 | Tsai | |
| 2004/0135425 A1 | 7/2004 | Irie | |
| 2006/0267397 A1 | 11/2006 | Possamig et al. | |
| 2012/0056468 A1 | 3/2012 | Tsai | |
| 2014/0015307 A1 | 1/2014 | Poertner | |
| 2014/0042798 A1 | 2/2014 | Iwai et al. | |
| 2015/0096672 A1 | 4/2015 | Tsai | |
| 2015/0306907 A1 | 10/2015 | Granier et al. | |
| 2015/0360510 A1* | 12/2015 | Poertner | B60B 1/003 301/6.9 |

FOREIGN PATENT DOCUMENTS

| | | | | |
|---|---|---|---|---|
| EP | 2374632 A1 | | 10/2011 | |
| EP | 2684707 A1 | | 1/2014 | |
| EP | 2765009 A1 | * | 8/2014 | ............. B60B 1/003 |
| EP | 2765009 A1 | | 8/2014 | |
| EP | 1625028 B2 | | 5/2015 | |
| EP | 2937227 A1 | | 10/2015 | |
| GB | 2101541 A | * | 1/1983 | ............. B60B 21/08 |
| JP | 2004 210242 | | 7/2004 | |
| KR | 20100007955 A | * | 1/2010 | ............. B60B 21/08 |
| TW | 201406568 A | | 2/2014 | |

OTHER PUBLICATIONS

Chinese Office Action for Application No. 2016-10879361.7, dated Sep. 27, 2020 with English translation.
Italian Search Report and Written Opinion in Italian Application No. UB2015A004195, dated Jun. 14, 2016, with English translation.
Taiwanese Office Action for Taiwanese Application No. 105132140 dated Apr. 20, 2020.

* cited by examiner

BICYCLE WHEEL COMPONENT WITH BRAKING AREA MADE OF COMPOSITE MATERIAL AND RELATED MANUFACTURING PROCESS

CROSS REFERENCE TO RELATED APPLICATIONS

This application claims the benefit of application Ser. No. 15/287,340, filed on Oct. 6, 2016, and claims the benefit of Italian Application No. UB2015A004195, filed on Oct. 7, 2015, which are both incorporated herein by reference as if fully set forth.

FIELD OF INVENTION

The present invention relates to a wheel component of a bicycle or similar vehicle having at least one braking area configured to cooperate with a braking body, said braking area being made substantially of composite material. The present invention also relates to a process for manufacturing such a wheel component.

BACKGROUND

In bicycles, slowing down or braking a wheel takes place in various ways, including: through the clamping of jaws carrying pads about the rim, in particular on opposite side walls thereof, or more generally about a peripheral portion of the wheel (rim brake); or through pressing pads against a disc fixedly connected to the hub of the wheel (disc brake).

In the present description and in the attached claims, under "braking body", a pad is meant to be indicated.

In the present description and in the attached claims, under "wheel component", a rim of a spoked wheel, a rim or peripheral portion of a disc wheel or of a spider wheel, or a disc of a disc brake is meant to be indicated.

More specifically and as well known, a rim of a spoked wheel comprises an annular body intended to be coupled, on a radially outer side, with a tire of the bicycle wheel and, on a radially inner side, with a plurality of spokes of the bicycle wheel, that are in turn coupled with a hub of the wheel. Typically, the annular body of the rim comprises opposite side walls. On the side walls there are brake tracks or areas, on which the pads of a brake of the bicycle act.

In the present disclosure and in the attached claims, under "composite material", a material comprising structural fibers incorporated in a polymeric material, sometimes called "matrix" or "resin" is meant to be indicated.

The polymeric material can be thermoplastic material or thermosetting material.

The structural fibers typically comprise carbon fiber, glass fiber, aramid fiber, ceramic fiber, boron fiber and/or combinations thereof. The geometry of the reinforcing fibers is extremely varied, ranging from very short fibers randomly arranged in the matrix, to more or less long fibers arranged in a more or less orderly manner, for example in parallel bundles, in a woven or non-woven bidirectional manner, and/or combinations thereof. Components made of composite material are typically manufactured through compression molding in the case of thermosetting polymeric material, and through injection molding in the case of thermoplastic polymeric material. The starting material can also take up various configurations, for example it can comprise dry fiber or fiber preimpregnated with polymeric material; the pre-impregnated fiber can be in the form of "mats", of loose conglomerates, or even of "mats" of conglomerates, wherein under "conglomerates", substantially two-dimensional small pieces or three-dimensional small pieces of fiber segments are meant to be indicated, inside which conglomerates the fiber segments are usually arranged parallel to one another or even according to a woven structure; under "mat", a starting material having a negligible thickness with respect to the width and length dimensions is meant.

Bicycle wheel components made of composite material offer the advantage of combining high rigidity and mechanical strength with a low weight.

According to EP 2 684 707 A1, carbon surfaces—such as those of a carbon fiber rim exposed after a short period of brake use when a mold release material and the outer layer of epoxy wore away—are relatively poor at resisting wear and enhancing frictional performance, and thus carbon fiber surfaces are generally unsuitable as brake tracks for fiber reinforced plastic (FRP) rims. It therefore discloses a rim for a bicycle, including a radially outer tire-engaging portion, a radially inner spoke-engaging portion, a first sidewall, a second sidewall spaced apart from the first sidewall, the first and second sidewalls extending inwardly of the radially outer tire-engaging portion, and a brake track disposed on the first and second sidewalls comprising a layer of non-fibrous microparticles such as high hardness, high thermal conductivity and high thermal resistance microspheres of silicon carbide, silicon nitride, boron carbide, ceramic, metallic particles i.a. The microparticles are embedded, preferably partially embedded in an epoxy matrix and partially exposed. The range of microparticles to epoxy resin is preferably about 5-60% abrasive microparticles, by weight. The method of manufacturing involves the application to an FRP rim of a track of non-fibrous microparticles of silicon carbide or the like, suspended fully or partially in a layer of high temperature, high toughness epoxy resin; then the removal of an amount of epoxy from the brake track to fine tune the coefficient of friction of the brake track as well as the surface topography. In this manner, the FRP can be optimized for wet-weather braking. More specifically, according to the document, after curing the rim, excess resin is removed and the rim is ready to have the outmost part of the epoxy of the brake track removed to expose the microparticles. According to the document, this step may not be necessary but wet weather braking performance on a new carbon fiber rim is typically poor and the surface may take weeks to "break in" as brake pads slowly abrade away the epoxy to expose the microparticles embedded within. Therefore, the epoxy covering the microparticles is lightly abraded away in an abrasive blasting operation. This blasting can be fine-tuned using a media such as garnet which is harder than the epoxy resin but less hard than the abrasive particulates molded into the brake surface.

The Applicant observes that the addition of the microparticles causes undesirable processing costs and time, in addition to being a processing that is not very repeatable.

Document EP 1 625 028 B2 discloses a rim for bicycles and the like, comprising at least one braking area on at least one flank of the rim for placing a braking member, said braking area essentially consisting of fiber-reinforced plastic in the form of a layered semi-finished reinforcing fiber sheet product, wherein the surface of the braking area exhibits a percentage of exposed reinforcing fiber of more than 10% and up to 90%, the reinforcing fiber being exposed by removal of the material of the braking area.

According to such a document, as a consequence of the compression molding, the excess polymeric material that has been pushed to the surface of the braking area would be a drawback in terms of wear with respect to steel or aluminum rims. In order to avoid this without applying aluminum layers or parts, and without resorting to galvanic coating, and without applying additional hard material, the document teaches to carry out chip removal machining, namely with a cutting tool, or machining by erosion along the entire brake track, during which machining the surface polymeric material is removed and sections of fiber are exposed. According to the document, the rim obtains definite properties that are mainly determined by the physical properties of the fibers, such as good braking behavior, low wear (the wearing of the surface is extremely low and is limited mainly to the rubber brake lining), and good thermoconductive properties (good removal of the heat due to the action of the brakes). In addition, it is possible to provide for grooves to improve wet behavior. The document envisages the use of composite materials different from layered material.

Document EP 2 765 009 A1 recognizes that the machining with a cutting tool of such a solution causes damage to the reinforcing fibers and consequent weakening of the rim, and observes that such a solution in fact makes it necessary to use a material richer in fiber that is subsequently removed at the surface, with a consequent waste of material and increased weight of the rim. In order to overcome said drawbacks by providing a rim with at least one braking area substantially made of composite material that is light, strong and easy to manufacture, document EP 2 765 009 A1 teaches to machine—in particular by laser cutting with a numerical control machine CNC and more in particular through a FIR laser, but more in general through milling, turning, filing or scraping—at least one part of the braking area to form a macroscopic surface structure in order to improve the braking properties, in particular in the wet.

The macroscopic structure is in particular intended to interrupt or evacuate a film of water in the braking area, and in particular comprises narrow cavities extending at least in part according to a radial direction and/or that open towards the outside of the rim. The cavities are preferably made in the resin only, so as not to deteriorate the mechanical properties of the fibers, but vice-versa they can be made in the fiber only or in both of the components of the composite material. The cavities can have a rectangular, triangular or rounded section and others; alternatively, the macroscopic structure can comprise substantially rectangular areas, sectors or the entire annular braking area. The document also teaches to use an irregular macroscopic structure, for example aperiodic and/or different macroscopic structures on the two flanks of the rim to avoid phenomena of resonance. It is provided for the rim to have, on one or both flanks, one or more braking areas, and also for the macroscopic structure to be made only on one braking area or on a part thereof. Moreover, the braking area can be made on a disc of a disc wheel or on a disc of a brake.

In such a document, laser machining is indicated as advantageous since it allows, amongst other things, the selective removal of material of the composite material, in particular the resin, to be controlled in order to obtain a better friction coefficient, in particular for braking in the rain; moreover, it allows cavities to be made having a larger surface without weakening the structure of the wheel. By removing only the surface resin with the laser, the appearance of the carbon fiber fabric remains visible and, according to the document, the surface is neither smooth as it was originally, nor rough like through machining with a cutting tool, rather it is gentle, as a fabric could be; the structure is recognizable to the eye and to the touch, since the removal of the resin produces areas in slight depression and slightly raised areas. The document teaches to select a laser for which the resin is not transparent, preferably a CO2 laser in the far infrared, for example having an emission wavelength of about 10.6 micron, and teaches that the difference existing between the combustion temperature of the resin (between 400° C. and 600° C.) and that of carbon fiber (over 1500° C.) allows the laser to be adjusted so that the carbon fibers are not influenced by the laser. Moreover, the document recognizes that in reality it is not possible to precisely determine the surface thickness of the resin, and thus teaches to adjust the laser so that at least 80% of the resin is removed, and so that at most 20% of the carbon fiber is damaged or cut.

The Applicant observes that the machining of such a document, when carried out in sufficiently large regions, causes a surface that can generate noise during braking; vice-versa when carried out through discrete cavities it does not seem to result in good dry-weather braking performance.

SUMMARY

The technical problem at the basis of the invention is to provide a bicycle wheel component and a process for manufacture thereof that preserve the strength of the starting composite material, and that offer good braking properties, like good dry-weather and wet-weather braking performance, in particular in terms of braking times, and low or no noisiness, as well as to keep the costs and/or the complexity of the process as low as possible.

In an aspect, the invention relates to a process for manufacturing a bicycle wheel component, comprising the steps of:

a) providing a bicycle wheel component having at least one braking area configured to cooperate with a braking body, said braking area being made by molding of composite material comprising structural fibers incorporated in a polymeric material, and b) carrying out post-molding machining of at least one region of said at least one braking area, comprising the steps of:

b1) removing only polymeric material, without removal of the structural fiber, from the entire region so that the structural fiber outcrops at least in part from the polymeric material, and b2) removing the structural fiber and possibly the polymeric material according to at least one groove within the region.

Preferably step a) of providing comprises molding the entire bicycle component in composite material.

During step b2), the structural fiber is deliberately cut.

Preferably, step b2) takes place according to a pattern of grooves or a spiral groove.

Preferably, step b2) is subsequent to step b1).

Preferably, step b1) and/or step b2) are carried out by pyrolysis.

More preferably, step b1) and/or step b2) are carried out by pyrolysis through a laser beam, even more preferably through a laser in the near infrared.

Even more preferably, step b1) and step b2) are carried out by pyrolysis through laser beams emitted by a same laser source, by varying at least one of: the emitted power, the emission frequency of the pulses in the case of a pulsed source, the number of scans of the region, the spacing between scanning lines.

Preferably, in step b1) at least 60% of polymeric material is removed, so that the residual amount of polymeric material in at least one region of said at least one braking area amounts to no more than 40% with respect to the amount of polymeric material present in a neighboring zone.

Preferably, step b2) is carried out so that the cut structural fibers represent no more than 9%, preferably about 5% of the surface of the braking area.

Preferably, in step b2) the structural fiber and possibly the polymeric material are removed according to a pattern of grooves comprising a large number of narrow grooves.

In another aspect, the invention relates to a bicycle wheel component having at least one braking area configured to cooperate with a braking body, said braking area being made substantially of composite material comprising structural fibers incorporated in a polymeric material, characterized in that in at least one region of said at least one braking area, the structural fiber outcrops at least in part from the polymeric material, and said at least one region of said at least one braking area comprises at least one groove through the structural fiber and possibly the polymeric material of the composite material.

In this way, said at least one region of said at least one braking area comprises, in a surface layer, an amount of polymeric material smaller than, and an amount of structural fiber substantially equal to a neighboring zone of said at least one region of said at least one braking area.

The amounts are meant per unit area.

Preferably, said at least one region of said at least one braking area comprises, in a surface layer, an amount of polymeric material less than 40% with respect to the amount of polymeric material present in a neighboring zone.

The wheel component has such characteristics when it is new, namely upon leaving the factory, and not worn by a braking body.

At said at least one groove, the structural fiber is cut.

Preferably, the cut structural fibers represent no more than 9%, preferably about 5% of the surface of the braking area.

Preferably, said at least one groove comprises a pattern of grooves or a spiral groove.

In embodiments, the wheel component is a rim of a spoked wheel, or a rim or peripheral portion of a disc wheel or of a spider wheel, and the braking area(s) is (are) brake track(s) annularly extending to cooperate with a pad of a rim brake.

Alternatively, the wheel component is a disc of a brake, and the braking area(s) is (are) brake track(s) annularly extending to cooperate with a pad of a disc brake.

Preferably, at least at said at least one braking area, the composite material has a fiber content (Fiber areal weight—FAW) in a surface layer lower than a fiber content in a non-surface layer.

Preferably, at least at said at least one braking area, the composite material has a fiber content in a surface layer equal to 100 g/m2 or less.

Preferably, the wheel component is obtained with the above process.

In an aspect, the invention relates to a bicycle wheel comprising a wheel component as stated above.

BRIEF DESCRIPTION OF THE DRAWINGS

Further features and advantages of the present invention will become clearer from the following detailed description of some preferred embodiments thereof, made with reference to the attached drawings. The different features illustrated and described with reference to the individual configurations can be combined with each other as desired. In the following description, for the illustration of the figures, identical or similar reference numerals will be used to indicate constructive or functional elements with the same function or an analogous function. In the drawings.

DETAILED DESCRIPTION OF THE PREFERRED EMBODIMENTS

Figure 1:
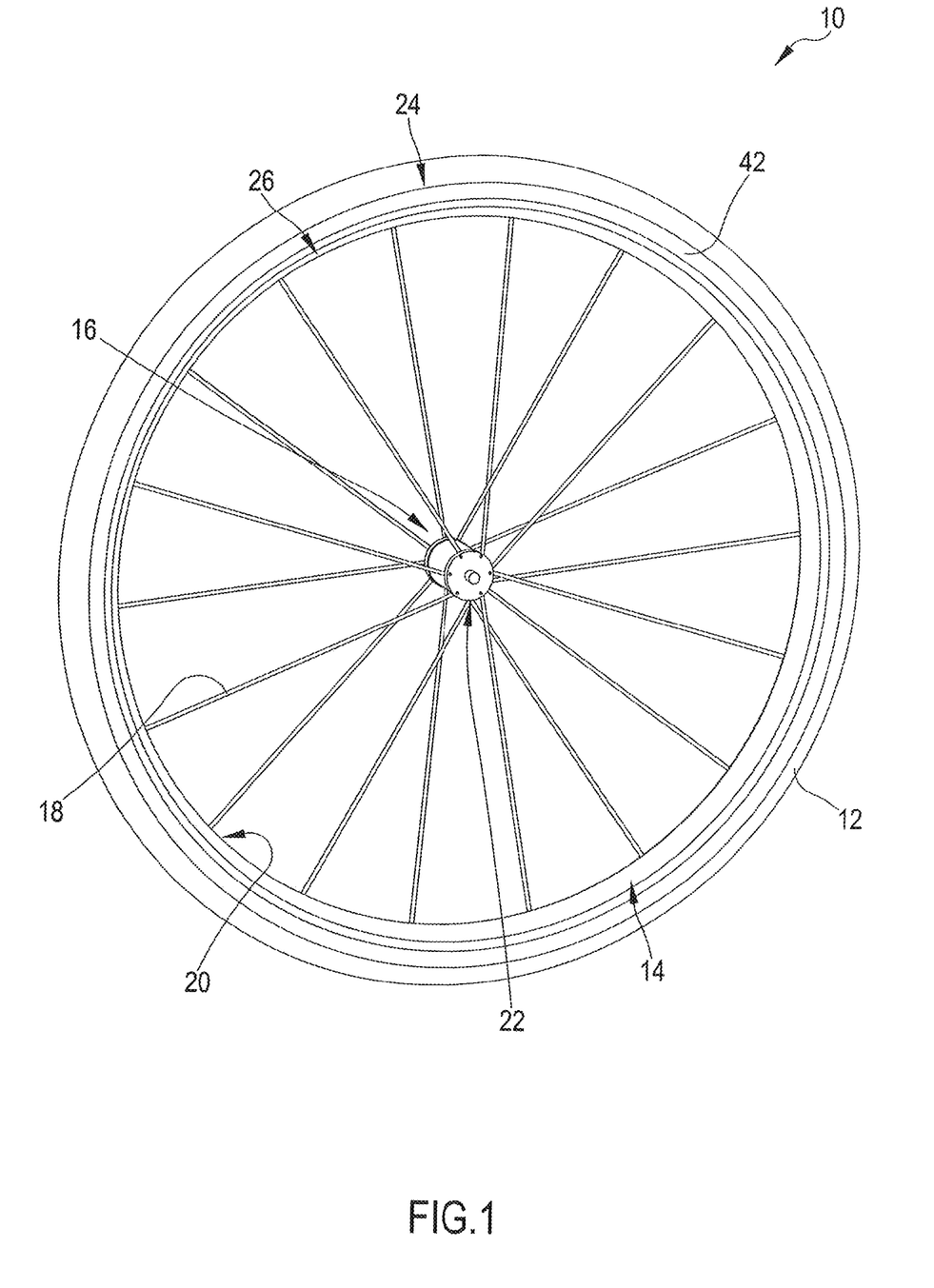
FIG. 1 is a perspective view of a bicycle wheel of the spoked type.
Figure 2:
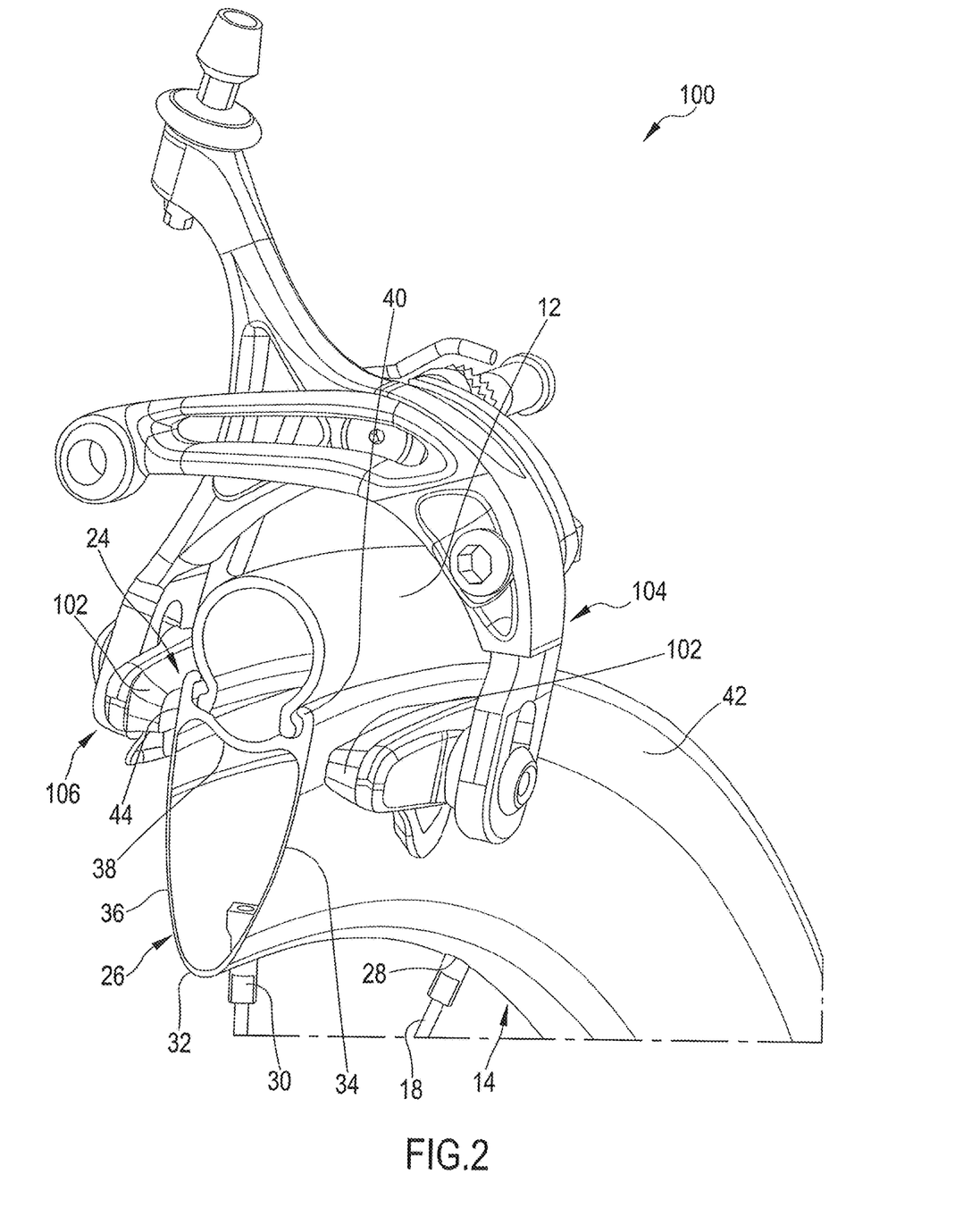
FIG. 2 is an enlarged perspective view of some components of the wheel of FIG. 1.

FIG. 1 illustrates, by way of an example, a bicycle wheel 10 of the spoked type, and FIG. 2 illustrates an enlarged perspective view of some components thereof.

The wheel 10 essentially comprises a tire 12, a rim 14, a hub 16 and a plurality of spokes 18 extending between the rim 14 and the hub 16 and connected, at respective ends 20, 22, thereto.

The illustrated spoking—namely number of spokes, directions according to which they extend, type of attachment to the hub and to the rim—is purely indicative.

The rim 14 comprises an annular body intended to be coupled, at a radially outer portion 24 thereof, with the tire 12 and, at a radially inner portion 26 thereof, with the plurality of spokes 18. For this purpose, a plurality of holes 28 for the attachment of nipples 30 for adjusting the tension of the spokes 18 are formed on the radially inner portion 26 of the annular body.

The illustrated rim 14 comprises a bottom wall or lower bridge 32 on which said holes 28 are made, a pair of side walls 34, 36, and a partition wall 38 between the radially outer portion 24 and the radially inner portion 26, or upper bridge 38, extending substantially parallel to the bottom wall 32 at a certain height along the side walls 34, 36. The rim 14 shown has, overall, a substantially A-shaped section.

The illustrated rim 14 is of the Clincher type, and the side walls 34, 36 thereof form wings 40 for holding the beads 12a of the tire 12. The upper bridge 38, the wings 40 and the radially outer region of the side walls 34, 36 define said radially outer portion 24 for coupling with the tire 12.

The illustrated rim 14 is merely exemplifying and a rim according to the invention can have any configuration. Merely by way of an example: the illustrated rim is of the Clincher type and is configured for the use of a tubeless tire, but the tire could be of the type with an air chamber or solid, or the rim could be configured for gluing a tubular tire; the rim shown has a symmetrical profile, but it could have an asymmetrical profile; it has a high profile, but it could have a medium, low or very low profile (shorter side walls in the radial direction) or very high profile (even longer side walls in the radial direction); the illustrated rim has an A-shaped section, but it could have a U-shaped section, a section with plural empty chambers, a solid section; etc.

On each of the side walls 34, 36, a braking area or brake track 42, 44 is formed, configured to cooperate with a braking body or pad 102 of a rim brake 100 of the bicycle. Each brake track 42, 44 extends annularly on the side wall 34, 36.

In a preferred manner, although not necessarily, the brake tracks 42, 44 are formed on regions of the side walls 34, 36 that are flat and parallel to each other. In this case, each brake track 42, 44 is a flat annular region concentric with the wheel, in the form of an annulus.

In principle, only one brake track 42, 44 could be formed on only one of the two side walls 34, 36.

The illustrated brake 100 is of the Caliper type, but the invention can be used with rim brakes of any other type, like for example Cantilever brakes, U-brakes, V-brakes. In a well-known way, the jaws 104, 106 of the brake 100 are actuated by a manual control, for example through a sheathed cable, and clamp the pads 102 against the rim 14. While the wheel 10 moves, each pad 102 slides along the respective brake track 42, 44 causing the slowing down of the wheel 10 and finally braking.

Instead of a rim of a spoked wheel, the wheel element bearing at least one braking area according to the invention could be a lenticular wheel (also called a disc wheel), having a pair of disc-shaped elements that cover or replace the spokes, or a spider wheel wherein instead of the spokes, a small number (like 4-5) of rigid elements connects the rim to the hub.

Figure 3:
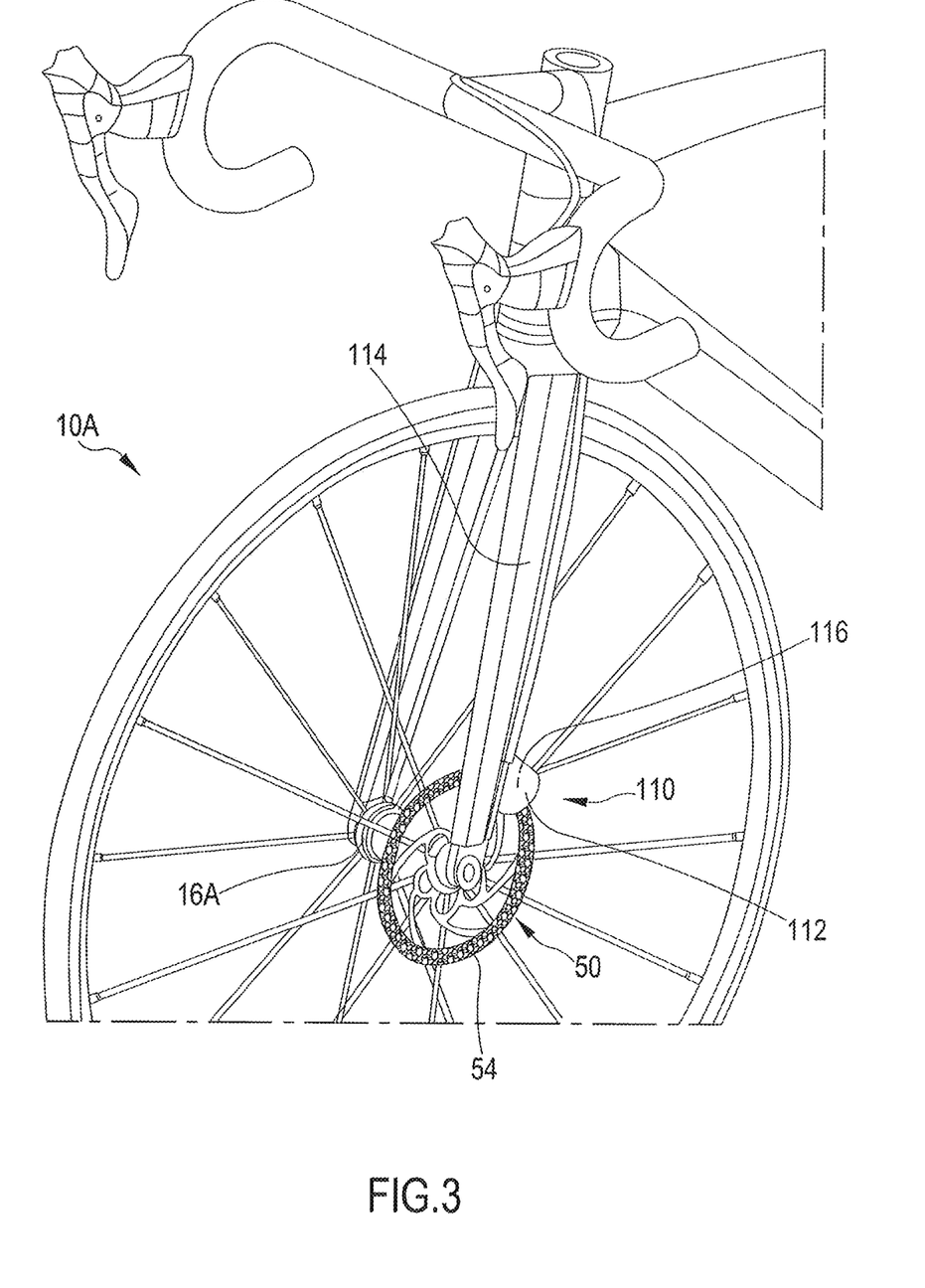
FIG. 3 is a partial perspective view of a bicycle wheel provided with a disc brake.

FIG. 3 illustrates a wheel 10A provided with a disc brake 110. A disc 50 is rotationally integral with the hub 16A of the wheel 10A, namely it is mounted on the hub 16A in such a manner as to be co-rotating therewith. A caliper of the brake 112 is mounted on the fork 114 of the bicycle—on the frame in the case of the rear wheel—and houses pads 116 (not directly visible), which act as braking body. During braking, a mechanism presses the pads 116 against the disc 50 slowing down and eventually braking the wheel 10A.

The disc 50 comprises a substantially flat circular body and, despite the name, of a shape closer to that of an annulus than disc-shaped. The disc 50 can comprise a plurality of openings for the dissipation of the heat generated during braking.

On each of the faces of the disc 50, a brake track or area is formed, one of which is visible and indicated with reference numeral 54, configured to cooperate with the braking body or pad 116. Each brake track 54 extends annularly on the face of the disc 50. Each brake track 54 is a flat annular region concentric with the wheel, shaped like an annulus.

According to the invention, the rim 14, the disc 50 or more in general the wheel element is made, at least at the or each braking area 42, 44, 54, in a composite material as defined above, comprising structural fibers incorporated in a polymeric material.

Merely by way of an example, reference will be made hereinafter to a polymeric material comprising carbon fibers incorporated in a thermosetting resin.

Merely by way of an example, reference will further be made to such a polymeric material in which the carbon fiber is bi-directional, woven according to a plain weave, wherein each weft "thread" and each warp "thread" comprises however a substantially flat bundle of several parallel fibers. Such a material is also known as plain fabric.

The remaining part of the wheel component can also be made of a different material, for example a metallic material. In the case of a rim 14, for example, the radially outer portion 24 thereof provided with the brake track(s) 42, 44 can be made of composite material, while the radially inner portion 26 thereof can be made of metal.

As is known, a wheel element 14, 50 made of composite material comprising structural fibers incorporated in a polymeric material is obtained by molding, wherein the composite material is subjected to a temperature profile and possible a pressure profile suitable for causing the cross-linking of the thermosetting polymeric material or the hardening of the thermoplastic polymeric material. Typically, a thermosetting polymeric material is compression molded, while a thermoplastic polymeric material is injection molded. Further details relating to the molding of composite material are not provided since they are not deemed to be necessary because they are within the capabilities of those skilled in the art and per se well known.

As discussed in the introductory part, as a consequence of the molding an excess of polymeric material tends to form on the surface with respect to the composition deeper down. The surface is therefore very smooth.

Figure 4:
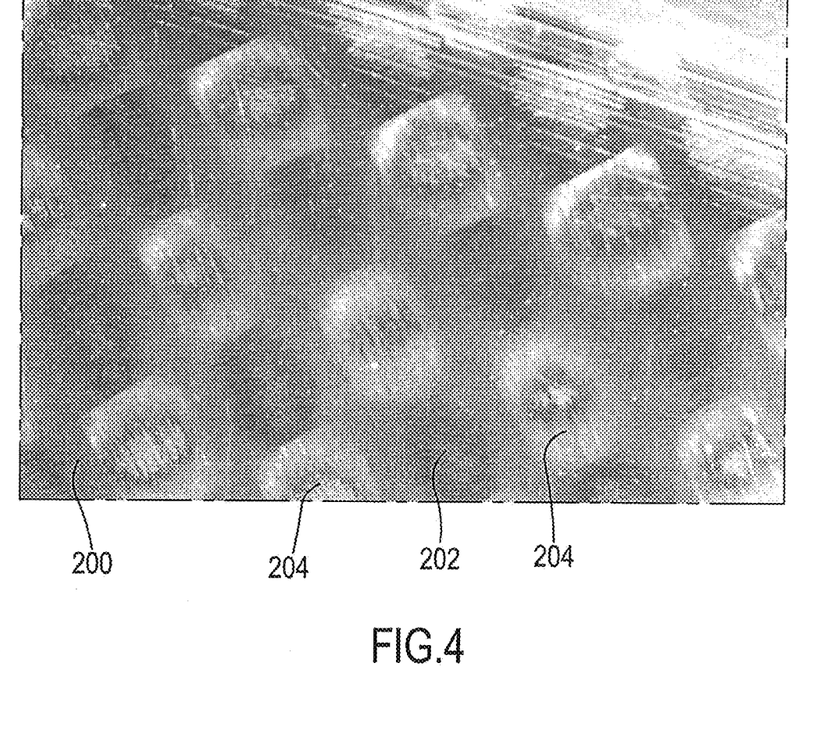
FIG. 4 is an enlarged image of a surface of composite material after molding.
Figure 5:
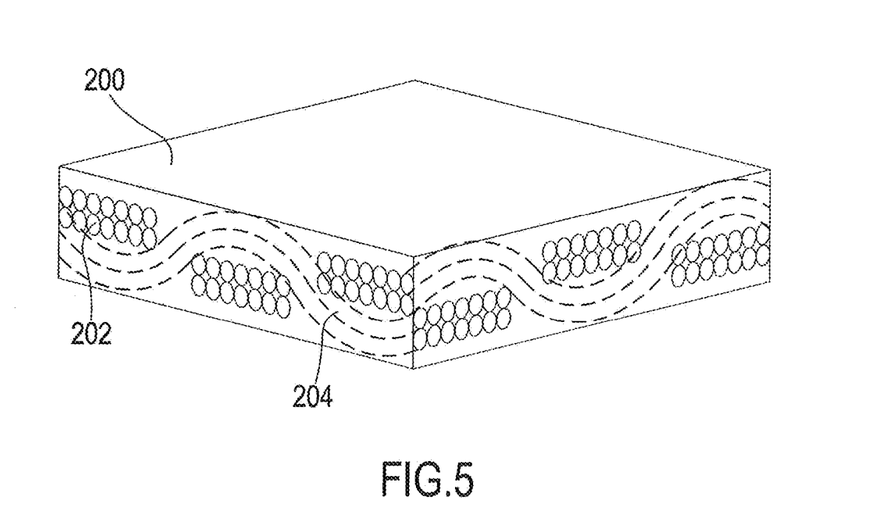
FIG. 5 is a totally schematic representation thereof.

FIG. 4 is an enlarged image of a surface of composite material comprising carbon fibers incorporated in a thermosetting resin, after compression molding. FIG. 5 is a totally schematic representation thereof.

The outermost layer, most at the surface, of the material consists of a film of only resin 200, which totally covers the fibers 202, 204. The surface is substantially smooth, also to the touch. It is possible to visually recognize—even with the naked eye—through the resin 200, only the portions of the warp fibers 202 that pass over the weft fibers (portions also called "liftings" in the field of textiles), of darker color, as well as the portions of the weft fibers 204 where the warp fibers pass thereunder (portions also called "idles" in the field of textiles), of lighter color.

Those skilled in the art will understand that the portions of the weft fibers 204 appear lighter than the portions of the warp fibers 202 both due to a reflection effect of the illumination—which is not perpendicular to the surface—, and because the weft fibers are slightly less taut with respect to the warp fibers and, on average, reach a slightly lesser depth under the surface of the resin 200.

In this particular case, it is a plain weave fabric from 3 k carbon fibers, having a fiber contents (Fiber areal weight—FAW) equal to 200 g/m2. The pitch of the weave is about 2 mm in both directions, and the difference in level between weft fibers and warp fibers is about 40 micron.

Due to the substantially smooth surface, the braking performance, especially in wet weather, of a wheel component made of composite material obtained only by molding is not satisfactory.

According to the invention, at least one region of at least one braking area 42, 44, 54 is subjected to post-molding surface machining as described below, which improves its braking performance and in particular wet-weather braking performance. It should be emphasized that also in the case in which there are two brake tracks or areas 42, 44, 54, even only one of the two may have one or more treated regions.

Furthermore, in the case in which both of the braking areas 42, 44, 54 are treated, the machining does not necessarily have to be the same. Indeed, a different machining can be advantageous from some points of view, as will become clear hereinafter.

The post-molding machining provides for a first machining and a second machining.

In the first post-molding machining, a removal of only polymeric material or resin 200 takes place, without removal of the structural fiber 202, 204. During the first machining, the structural fiber 202, 204 is not removed, abraded or cut intentionally—although it may happen in practice that some pieces of fiber, no longer sufficiently incorporated in the polymeric material, detach from the surface.

The first machining extends in the entire region that is meant to be treated, namely on the entire surface of said at least one region of said at least one braking area 42, 44, 54. For example, the first machining can extend over the entire annular brake track 42 of the rim 14, or over one or more sectors thereof.

As the degree of removal increases beyond the surface film of only resin 200, such removal of resin acts like the ablation of a glacier, "eroding" the resin and progressively leaving exposed the portions of fiber that are increasingly closer to the surface.

Thanks to the first post-molding machining, the structural fiber outcrops at least in part from the polymeric material.

Therefore, the treated region comprises, in a surface layer, an amount of polymeric material smaller than, and an amount of structural fiber substantially equal to, an untreated region, such as a neighboring region to the treated region. The amounts are meant per unit area.

The first machining produces areas in slight depression and slightly raised areas.

Figure 6:
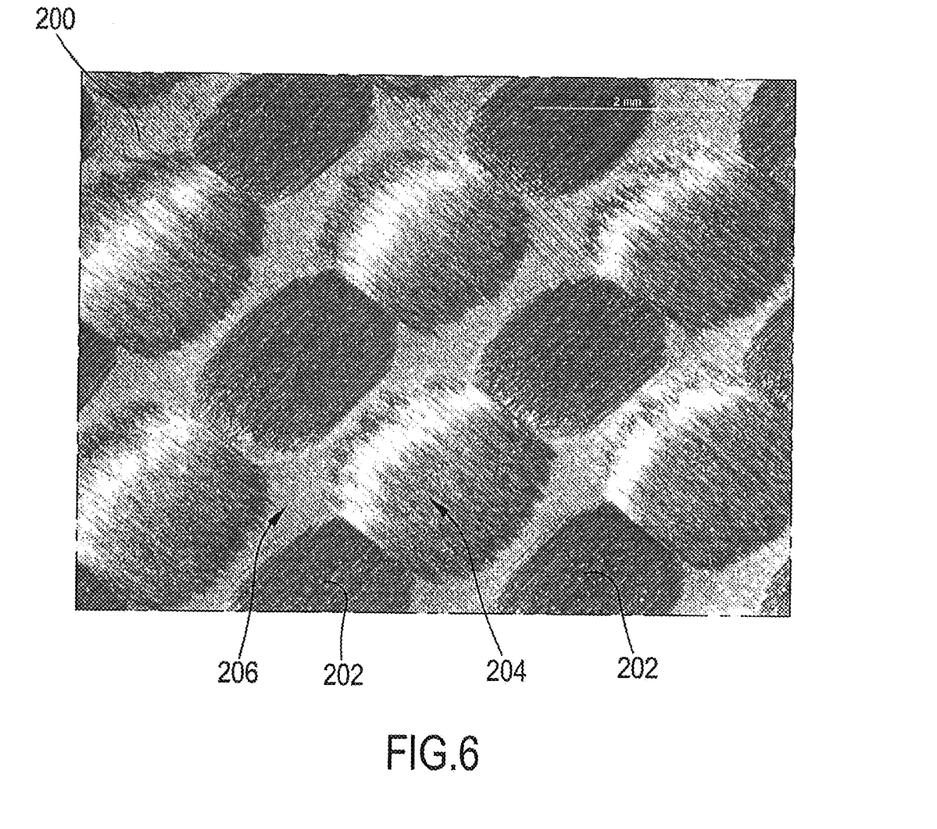
FIG. 6 is an enlarged image of a surface of composite material after a first machining according to the invention, carried out under first example conditions.
Figure 7:
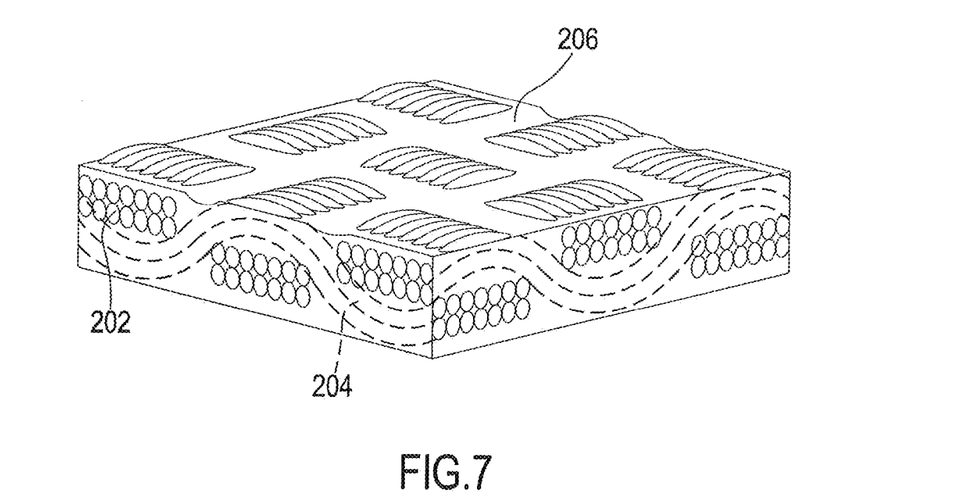
FIG. 7 is a totally schematic representation thereof.

FIG. 6 is an enlarged image of a surface of the material of FIG. 4 that has been subjected to a medium degree of removal of the resin, namely having an average amount of residual resin on the surface, and FIG. 7 is a totally schematic representation thereof.

It is manifest that the resin has been removed substantially down to the level of the fibers forming the warp threads 202 ("liftings"), which form small "humps", visible in dark color in FIG. 6. The fibers 204 forming the weft threads have been exposed in the central portion of the portions ("idles") where they are above the warp fibers, where they have the convexity towards the surface and form more pronounced "humps", easily recognizable and of light color in FIG. 6.

Where the fibers 202, 204 are exposed, there is no resin film 200 left.

Where the weft fibers 204 get under the warp fibers 202 (approaching the inflection point where the weft fibers 204 change curvature and become concave towards the surface), the thickness of the remaining resin 200 is still sufficiently great to cover and hide the weft fibers 204 themselves. In FIG. 6, indeed, strip-shaped areas 206 of resin 200 are recognizable, extending inclined from bottom left to top right.

Also to the touch, the surface is no longer smooth, rather the "humps" of weft fiber 204 and of warp fiber 202 and the "grooves" at the strip-shaped areas 206 of resin 200 can be felt.

Figure 8:
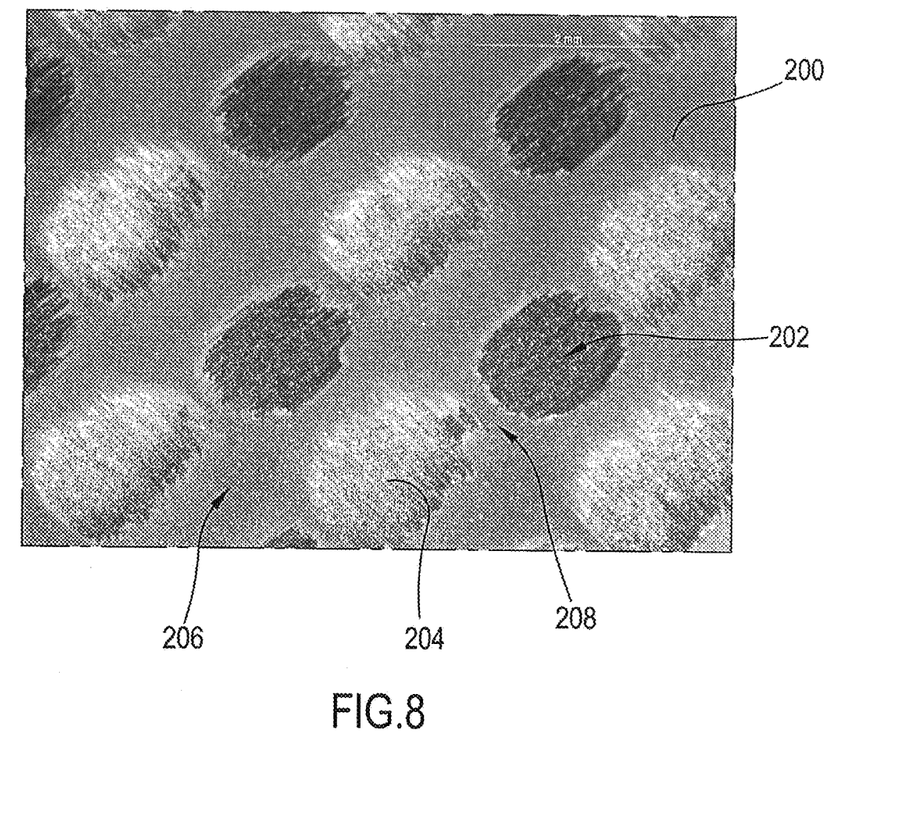
FIG. 8 is an enlarged image of a surface of composite material after a first machining according to the invention, carried out under second example conditions.
Figure 9:
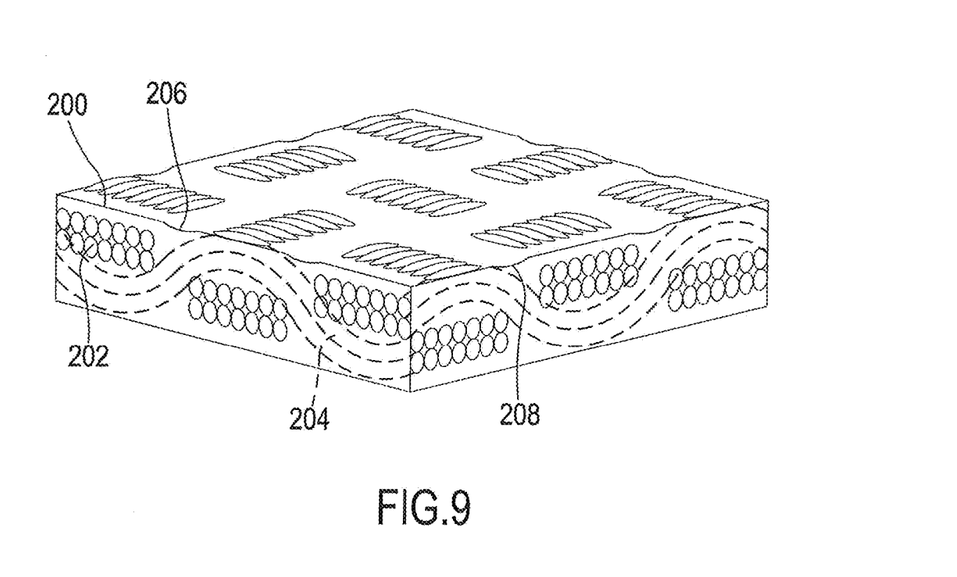
FIG. 9 is a totally schematic representation thereof.

FIG. 8 is an enlarged image of a surface of the material of FIG. 4 that has been subjected to a low degree of removal of the resin, namely having a high amount of residual resin at the surface, and FIG. 9 is a totally schematic representation thereof. The resin 200 has only been removed in the central regions of the portions where the warp fibers 202 pass over the weft fibers ("liftings") and of the portions where the weft fibers 204 pass over the warp fibers ("idles"), portions wherein the structural fibers protrude.

The "humps" of weft fiber 204 (light) are less pronounced with respect to the condition of FIGS. 6, 7, and the strip-shaped areas 206 of resin 200 extending inclined from bottom left to top right are wider.

The warp fibers 202 (dark) also protrude only in the central regions of the portions where they are over the weft fibers ("liftings"), forming small "humps".

Where the warp fibers 202 get under the weft fibers 204 (approaching the inflection point where the warp fibers 202 change curvature and become concave towards the surface), the thickness of the resin 200 is still sufficiently high as to cover and hide the warp fibers 202 themselves. Therefore, a second series of strip-shaped areas 208 of resin 200 forms, extending inclined from top left to bottom right.

Also to the touch, the "humps" of weft fiber 204 and of warp fiber 202 and the "grooves" at the strip-shaped areas 206, 208 of resin 200 can be felt. The surface is not smooth like in the initial condition right after molding, but is smoother than that of FIGS. 6, 7.

Figure 10:
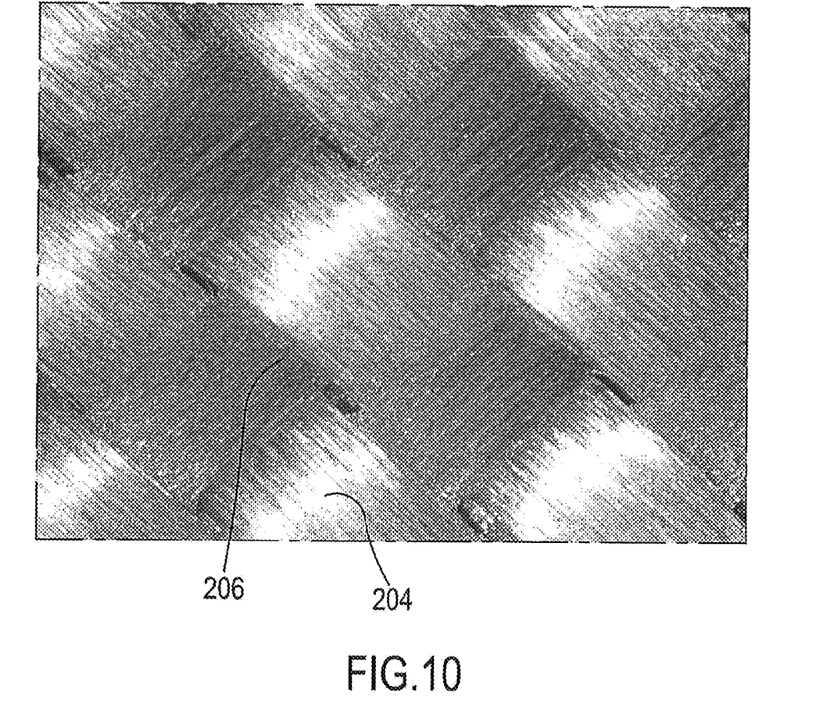
FIG. 10 is an enlarged image of a surface of composite material after a first machining according to the invention, carried out under third example conditions.
Figure 11:
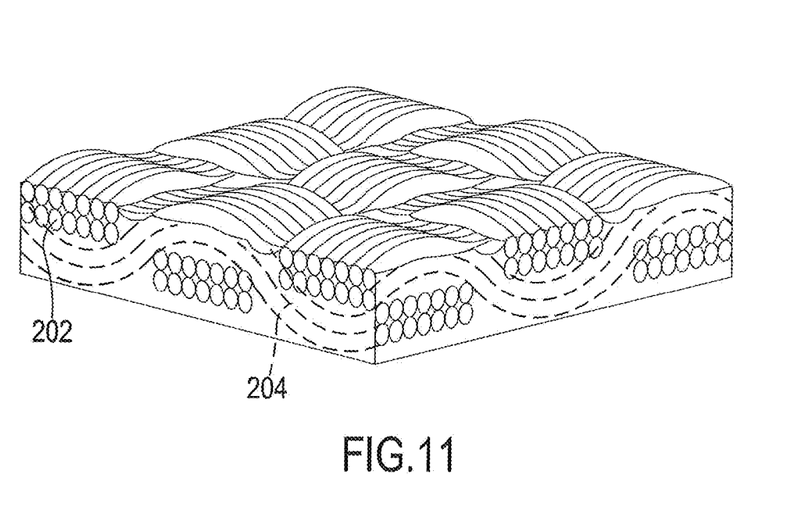
FIG. 11 is a totally schematic representation thereof.

FIG. 10 is an enlarged image of a surface of the material of FIG. 4 that has been subjected to a very high degree of removal of the resin, namely having a very small amount of residual resin at the surface, and FIG. 11 is a totally schematic representation thereof. The resin has been removed substantially entirely, and the fiber fabric is fully visible. In particular, all of the portions of either warp fiber 202 or of weft fiber 204, respectively, whichever is uppermost each time, are visible. The surface, also to the touch, is rough.

Those skilled in the art will understand that also in the case of nominally identical starting material and nominally identical molding process, two wheel components after molding can have even substantial differences both in the appearance of the structural fiber and in the amount of resin at the surface. Also during the first post-molding machining, even using nominally identical processes, even substantial differences both in the appearance of the structural fiber and in the amount of residual resin can ensue. Therefore, the figures commented upon above should be considered merely exemplifying.

It should be emphasized that the region subjected to the first post-molding treatment still has a certain surface uniformity, differently from a surface worn by a braking body such as a pad of a brake, which in general is characterized by non-uniform grooves due to the surface of the braking body and/or to earth, pebbles, etc. carried by the braking body on the braking area.

Those skilled in the art will also understand that in the case of different weaves or in the case of unwoven fabric, the appearance and the feeling to touch will also be substantially different from what has been exposed with reference to FIG. 4-11, but that in any case, as the degree of removal of the resin increases, the percentage of exposed fiber increases and the roughness of the surface increases.

Furthermore, the surface roughness can also be reduced (or increased) by changing the base composite material, and in particular by changing the number of filaments per bundle of fibers.

Only as a further example, it is possible to use a composite material comprising carbon fabric made with light 1 k fibers, for example with a fiber content equal to 100 g/m2, for which the weave pitch and the difference in level between warp fibers and weft fibers are smaller than those of the fabric made with 3 k fibers (of the order of 1.3 mm and of 20 micron, respectively). Furthermore, it is possible to use a composite material comprising glass fiber, for example with fiber content equal to 50 g/m2, for which the weaving pitch and the difference in level between warp fibers and weft fibers are even smaller (of the order of 0.4 mm and of 10 micron).

In an advantageous manner, in the case of molding of the bicycle component starting from composite material in "mats" it is possible to provide for using a comparatively light composite material for the surface layer of the wheel component, at least at the braking area 42, 44, 54 and/or at the at least one region thereof subjected to the post-molding machining according to the invention, and a comparatively heavy composite material for the non-surface layers. In this way, it is possible to obtain the desired surface roughness without decreasing the strength of the wheel component.

Therefore, in the wheel component the composite material can have, at least at the braking area, a fiber content (Fiber aerial weight—FAW) in a surface layer lower than a fiber content in a non-surface layer.

Preferably, in the wheel component the composite material has, at least at the braking area, a fiber content in a surface layer equal to 100 g/m2 or less.

The Applicant has tested the dry-weather and wet-weather braking performance of wheel rims subjected to the first post-molding machining in various example conditions of degree of removal of the resin, and has found the following. Two cycles each of several tens of braking actions were carried out, measuring the average braking time; between one cycle and the next one, a condition of use of about one thousand kilometers has been simulated.

The wearing of the brake pad slightly increases as the degree of removal of the resin increases. This is in accordance with expectations given that the surface roughness and therefore friction increase. It should be however emphasized that a certain wearing of the braking body is advantageous since it allows the surface of the braking body to be "renewed", and therefore allows friction or grip to be stabilized.

The dry-weather braking performance, in terms of braking time, remain substantially unchanged as the degree of removal of the resin increases, even if there is a slight worsening, which is also in accordance with the expectations given that surface roughness increases and therefore the actual contact surface with the braking body and the friction by adhesion decrease.

On the other hand, the wet-weather braking performance, in terms of braking time, substantially improve as the degree of removal of the resin increases: the braking times of the rim with high degree of removal of the resin are reduced to about one third of the braking times of the rim with low degree of removal of the resin. Without wishing to be bound to any theory, the Applicant considers that this is due to the fact that the film of water that tends to form between braking body and braking area is broken by the surface roughness.

The Applicant also believes that the improvement in wet-weather performance in any case reaches a maximum before the total removal of the polymeric material, when the braking body, by virtue of its own rigidity, makes contact only with the fibers that protrude beyond the surface of the resin, but no longer touches the resin: also by removing the further resin, there is no increase in friction.

On the other hand, as the degree of removal of the resin increases, the braking becomes accompanied by a certain amount of noisiness, which increases. Without wishing to be bound to any theory, the Applicant believes that this is due to the increase in surface roughness. In order to keep the noisiness low, it is therefore preferable to use a composite material with fibers having a low number of filaments per bundle.

Moreover, the Applicant observes that the resin of the polymeric material plays the important role of keeping the structural fibers together, and therefore of giving stability to the composite material.

Furthermore, the Applicant believes that the resin of the polymeric material also plays an important role of insulation from humidity and from atmospheric agents.

Furthermore, the Applicant observes that the machining by removal of polymeric material from the entire surface of the treated region, especially when it takes place with the technologies indicated hereinbelow, requires a non-neglectable machining time, and that such machining time increases as the degree of removal of the resin increases.

Overall, the Applicant therefore believes that a degree of removal of the resin that is too high is disadvantageous.

The Applicant has found that machining with medium degree of removal of the resin is sufficient, when the first post-molding machining is accompanied by the second post-molding machining according to the invention, described hereinbelow.

The first post-molding machining should be carried out in such a way as to remove at least 60% of polymeric material.

Therefore, in a surface layer, the amount of residual polymeric material in the treated layer amounts to no more than 40% with respect to the amount of polymeric material present in the area before the machining, and therefore in a neighboring zone.

In the case in which both of the braking areas 42, 44, 54 are treated, the degree of removal of the polymeric material can be different from one area to the other, for example to reduce overall noisiness.

In the second post-molding machining, removal of the structural fiber 202, 204—which is at least partially exposed in the first post-molding machining—and possibly of the polymeric material or resin 200 takes place. During the second machining, the structural fiber 202, 204 is deliberately cut.

In this regard, the Applicant observes that the average thickness of the structural fiber is so small that when a single fiber is notched by a surface machining, it can only either be totally freed from the resin or break, but it is not possible for only a part thereof to be removed, generating an elliptical section as would be possible in theory by sectioning a fiber at a curved portion thereof.

Unlike the first machining, the second post-molding machining does not extend over the entire surface of the treated region. On the contrary, the second machining provides for the removal of the composite material according to at least one groove.

In the present description and in the attached claims, under "groove" it is meant to indicate a recess of limited depth and width, and having a certain extension in length.

Preferably, the removal of the composite material takes place according to a pattern of grooves, namely a plurality of discrete grooves within the surface of the treated region.

Under "discrete grooves", it is meant to indicate that the minimum distance between two adjacent grooves is of at least one order of magnitude greater than the width of a single groove.

Preferably, when the braking area 42, 44, 54 is annular or comprises annulus sectors, the plurality of discrete grooves comprises rectilinear grooves extending in the radial direction with respect to the braking area 42, 44, 54.

As an alternative to the grooves extending in the radial direction, a different pattern of grooves can be provided for, in particular studied to promote the removal of water from the braking area 42, 44, 54 by centrifugal force during slowing down and braking.

For example, the pattern of grooves can comprise rectilinear grooves extending in a non-radial direction and/or curvilinear grooves and/or concentric grooves and/or wavy grooves.

The plurality of discrete grooves may or may not have a certain rotational symmetry. Under "rotational symmetry" it is meant to indicate that there is at least one rotation about an axis that leaves the overall arrangement of the grooves unchanged. In the case of annular braking area 42, 44, 54, the grooves can be evenly distributed, periodically distributed or aperiodically distributed along the circumferential direction.

Alternatively, in the second machining it is advantageously possible to form a spiral-shaped groove, analogous to the one described in the context of metallic rims in EP 2937227 (and equivalent U.S. Pub. 2015/306907).

In the rest of the present description and in the following claims, the expression "spiral-shaped groove" is used to generically indicate both an engraving extending without interruptions along a helical path (in this case the expression "single continuous groove" will be used) and a plurality of grooves (or pieces of groove) that follow one another along a helical path interrupted by surface portions free from grooves.

Figure 12:
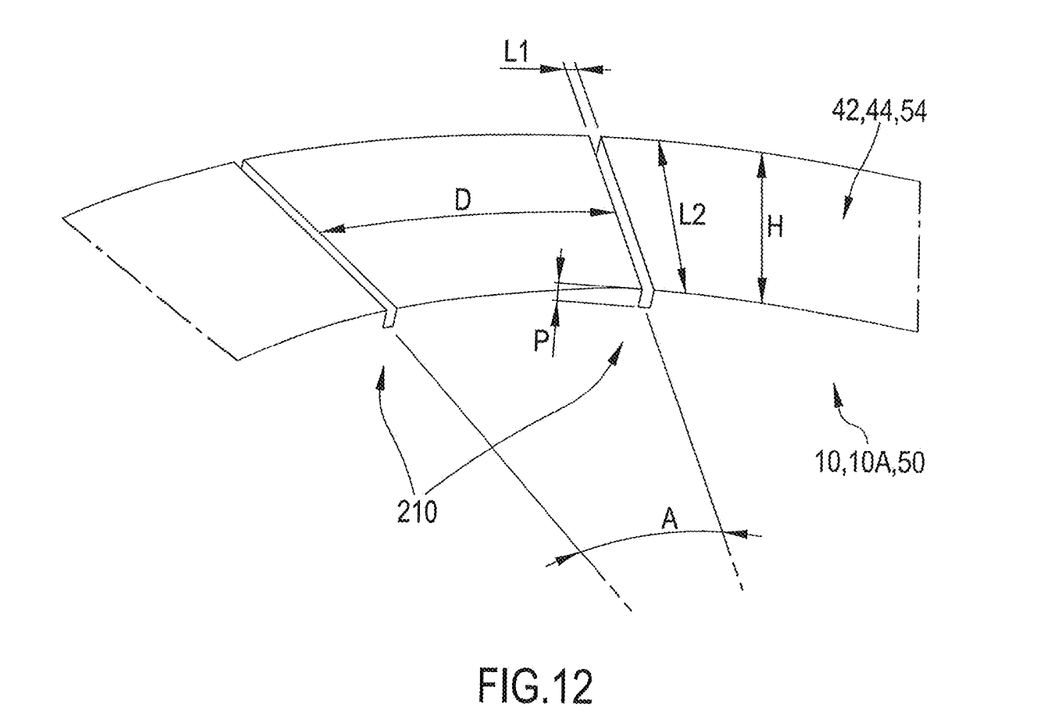
FIG. 12 is a schematic representation of an example pattern of grooves made with a second machining according to the invention.

FIG. 12 is a schematic representation of an example pattern of grooves made with the second post-molding machining.

The pattern of grooves comprises a plurality of grooves 210 extending in the radial direction in a braking area 42, 44, 54 having an annular shape or comprising sectors of an annulus—only a portion of which is in any case shown; the curvature is exaggerated for illustrative purposes and the figure is not to scale.

Each groove 210 has a width L1, a length L2 and a depth P.

Consecutive grooves 210 are spaced by an average distance D. The angular distance between consecutive grooves, neglecting the width of the grooves, is indicated with A.

A height of the braking area 42, 44, 54 in the radial direction is indicated with H.

The width L1 of the grooves 210 is less than the length L2, by at least one order of magnitude.

The depth P is preferably less than the width L1, more preferably by at least one order of magnitude.

The length L2 is preferably comparable with, more preferably equal to, as shown, the radial height H of the braking area 42, 44, 54.

The distance D between the grooves 210 and the angular pitch A are of course the inverse function of the number of grooves 210.

The total number of grooves is indicated with N.

Neglecting the width of the grooves 210, the relationship A=360°/N holds true.

The values for the magnitudes indicated above are preferably selected in such a way that the cut structural fibers represent no more than 9%, preferably about 5% of the surface of the braking area 42, 44, 54. It should be emphasized that the grooves 210 are not a wear indicator. Indeed, the use of grooves or recesses as wear indicators is known, but it is typically limited to a single angular position along an annular braking area. Furthermore, typically in this case such materials are used as to generate a chromatic contrast between the bottom of the groove or wear indicator recess and the surface in the surrounding braking area, which is not so in the case of the grooves 210.

The orthogonal section of the grooves 210 can be rectangular as shown, rounded, triangular or of another shape.

In the case in which both of the braking areas 42, 44, 54 are treated, the pattern of grooves can be different from one another, for example to limit noisiness.

Figure 13:
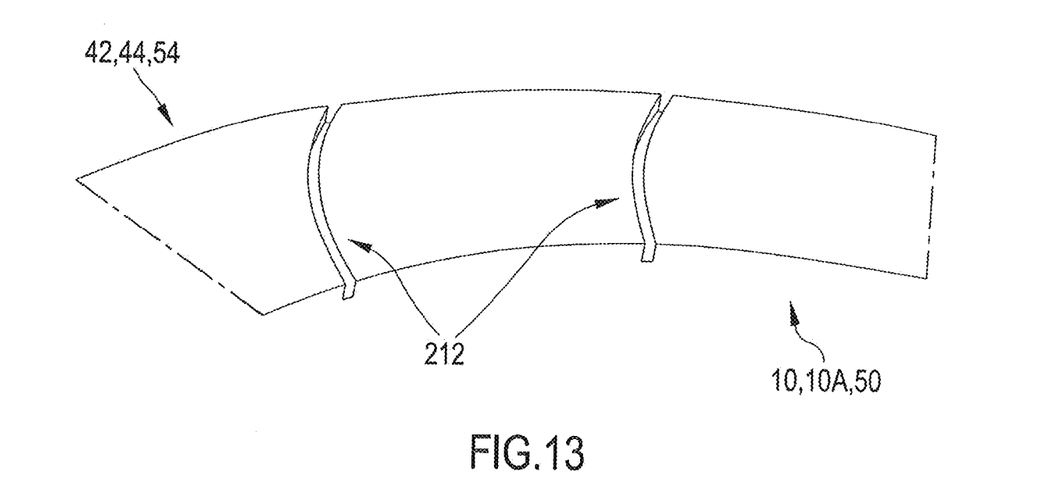
FIG. 13 is a schematic representation of another example pattern of grooves, made with the second machining according to the invention.

FIG. 13 is a schematic representation of another example pattern of grooves made with the second post-molding machining.

The pattern of grooves comprises a plurality of curved grooves 212, having a circumferential component as well as a radial component. The two circumferential and radial components are comparable, so that the grooves extend at about 45° with respect to the radial direction. Also in this case, the curvature of the braking area 42, 44, 54 is exaggerated for illustrative purposes and the figure is not to scale.

Figure 14:
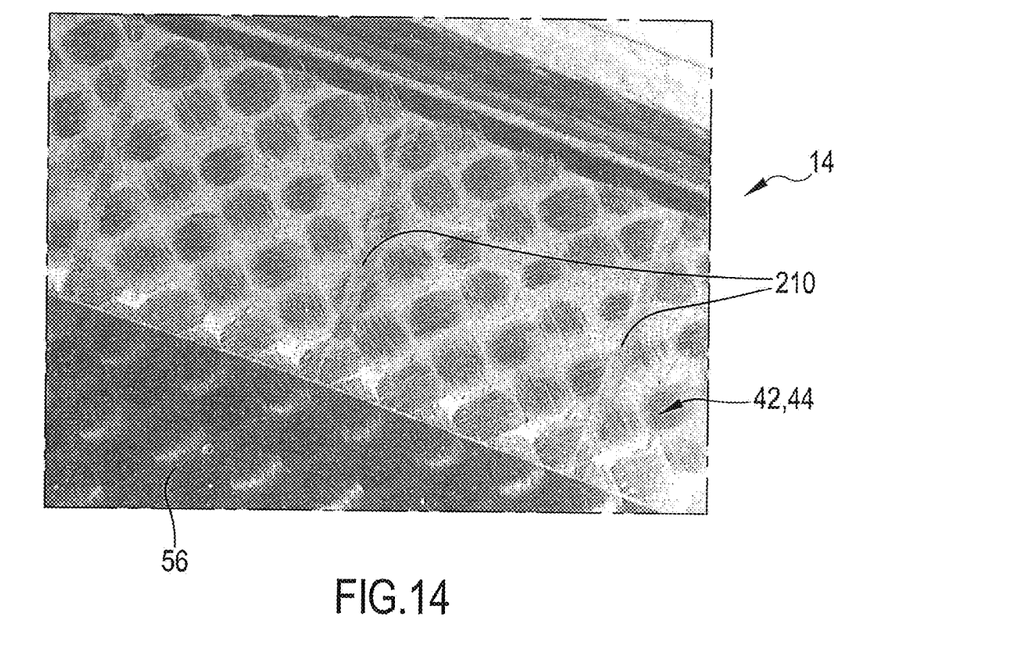
FIG. 14 is an enlarged image of a braking area on a rim, which has a first pattern of grooves in accordance with FIG. 12.

FIG. 14 is an enlarged image of a portion of a bicycle rim 14 made of composite material comprising carbon fiber in a matrix of thermosetting resin, wherein a braking area 42, 44 and a neighboring zone 56 are visible. The braking area 42, 44 has a medium amount of residual resin at the surface—namely it has been subjected to a medium degree of removal of the resin in the first post-molding machining—and has a pattern of grooves in accordance with FIG. 12 with preselected values of distance D, angular pitch A and width L1.

Figure 15:
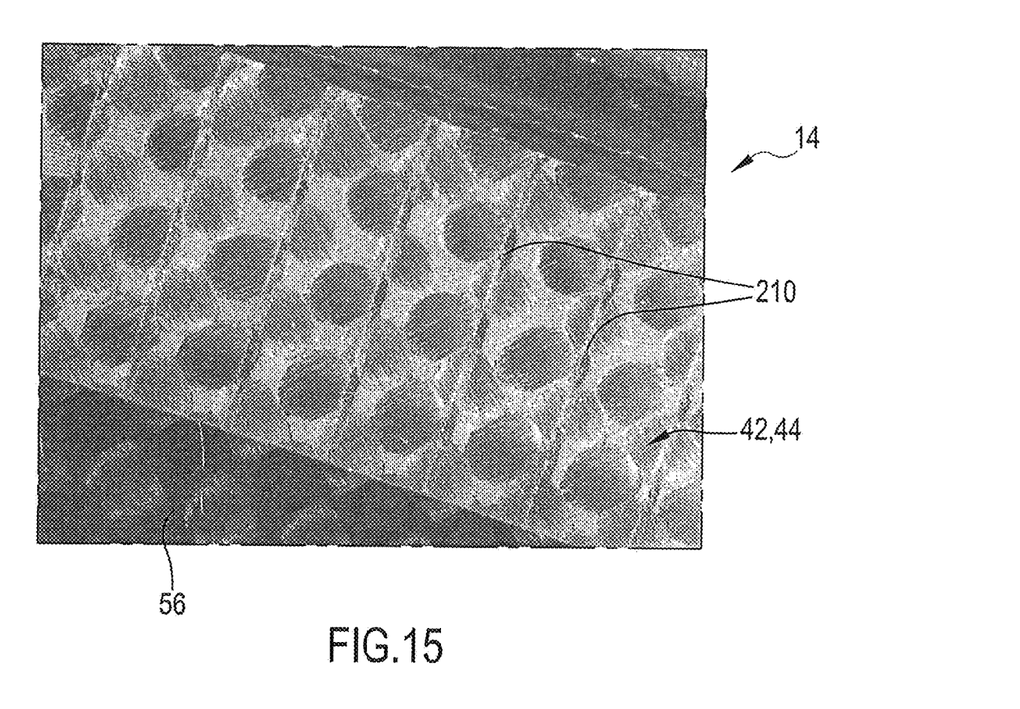
FIG. 15 is an enlarged image of a braking area on a rim, which has a second pattern of grooves in accordance with FIG. 12.

FIG. 15 is an image analogous to that of FIG. 14, wherein the pattern of grooves is in accordance with FIG. 12, but with smaller distance D and angular pitch A, and a smaller width L1.

In other words, in FIG. 14, comparatively, there are few wide grooves 210, while in FIG. 15, comparatively, there are many narrow grooves 210.

The Applicant tested the dry-weather and wet-weather braking performance of wheel rims also subjected to the second machining outlined above, and found the following. Also in this case two cycles each of several tens of braking actions were carried out, measuring the average braking time; between one cycle and the next one, a condition of use of about one thousand kilometers has been simulated.

The wear of the brake pad is not substantially changed by the presence of the grooves, with respect to the rims subjected only to the first machining with the same degree of removal of the resin. This is in accordance with the expectations given that the grooves do not substantially change the average surface roughness.

The dry-weather braking performance also remains substantially unchanged with respect to the rims subjected only to the first machining with the same degree of removal of the resin, even if there is a negligible average worsening. This behavior is also in accordance with the expectations given that average surface roughness is substantially unchanged.

Advantageously, it was found that the second post-molding machining allows totally acceptable wet-weather braking times to be obtained already with a medium or even low degree of removal of the polymeric material during the first post-molding machining.

It was found that, the total percentage of cut fibers being set, better overall performance is obtained when the pattern of grooves 210 comprises many narrower grooves (like for example in FIG. 15) than when it comprises few wider grooves (like for example in FIG. 14).

Advantageously, furthermore, the grooves 210 substantially decrease, if they do not actually get rid of, the braking noisiness.

In terms of noisiness, grooves extending according to a direction having a circumferential component greater than or comparable to a radial component—like for example the grooves 212 of FIG. 13—may turn out to be preferable with respect to grooves extending according to a direction having a radial component greater than a circumferential component.

Overall, the provision of the second machining and of the grooves 210, 212 allows comparable performance to be obtained, keeping the degree of removal of the resin of the first machining low. Consequently, it is possible to obtain an effective braking area, more stable and better insulated thanks to the presence of a larger amount of residual resin at the surface.

For comparison, the dry-weather and wet-weather braking performance of wheel rims made with the same composite material and subjected, after molding, to "diamond grinding" machining, namely removal of the surface layer with a tool of comparable hardness to that of a diamond, was tested. With such machining, differently from the machining according to the invention, the removal of the structural fiber and of the polymeric material takes place simultaneously on the entire machined area, so that the machined surface remains substantially flat and smooth. A three-dimensional surface is not generated, as on the other hand in the case of the invention, wherein the structural fibers outcrop.

From the comparison it was advantageously found that the machining according to the invention improves the wet-weather braking performance.

Furthermore, the wet-weather braking performance of rims made according to the invention undergo substantially less deterioration with respect to diamond-ground rims. In this connection, the Applicant has found that the wet-weather braking times of diamond-ground rims can even double after a simulated use of only about 1000 km.

In dry weather, the performance of the rims made according to the invention and of diamond-ground rims are comparable.

It is worthwhile emphasizing that it is also possible to invert the order in which the two machinings are carried out. If on the one hand this results in a lengthening of the total machining times and an increase in the used power because there is a double passage at the grooves, on the other hand it can result in less neat edges of the grooves made in the second machining, with consequent lower wear of the braking body. It is also possible to carry out the two machining operations at the same time.

Preferably, after the post-molding machining there is a cleaning step of the braking area from the residues of structural fiber and of polymeric material generated during the ablation. Such a cleaning step can be carried out simply with plural passages of a cloth soaked in acetone.

Preferably, the selective removal of the polymeric material in the first post-molding machining and/or the formation of the grooves in the second post-molding machining take place by pyrolysis, namely by decomposition with thermal means.

In principle it is also possible to use chemical means for the selective removal of the polymeric material in the first post-molding machining.

Preferably, the pyrolysis takes place through a high-energy beam.

Preferably, the pyrolysis takes place through a high-energy beam with pulsed emission.

Preferably, the pyrolysis takes place through a laser beam.

More preferably, the pyrolysis takes place through a laser beam in the near infrared (NIR), like for example having a wavelength of 1064 nanometers. It is however also possible to use a laser beam in the green or in the ultraviolet or in the non-near infrared, for example. The use of a laser in the ultraviolet has the advantage of not causing any yellowing of the polymeric material, but in general it involves increased machinery costs and machining times that can even be twice as long, with respect to an NIR laser.

Since the polymeric material has a lower resistance to pyrolysis with respect to the structural fiber, it is sufficient to adjust the heat input by the high-energy beam in such a manner that in the first post-molding machining it is comparatively low, so that only the ablation or decomposition of the polymeric material takes place, while in the second post-molding machining it is comparatively high, so that the ablation or decomposition of the structural fiber also takes place.

For the adjustment of the heat input, both during the first machining to adjust the degree of removal of the polymeric material, and in the passage between the first and the second machining, it is possible to adjust the power and/or the focal length and/or the emission frequency of the pulses and/or the scanning speed of the high-energy beam.

The use of a same source for both machinings offers substantial advantages in terms of cost of the apparatus, of setup of a single station, and of necessary staff. Indeed, the wheel component does not need to be moved from one machining station to another, it being sufficient to change the operating parameters of the source between the first and the second machining.

An example configuration of a laser beam suitable for carrying out the first post-molding machining is as follows:
  Wavelength: 1064 nm
  Nominal power: 20 W
  Actual power: 100%
  Focal length: 254 mm
  Emission frequency of the pulses: 25 kHz
  Scanning speed: 1500-4000 mm/s
  Spacing between one scanning line and the next one: 0.05-0.075 mm This configuration allows i.a. the chromatic variation of the resin towards the yellow/brown color to be kept to acceptable levels.

As stated above, in order to increase the degree of removal of the resin, it is possible to increase the power and/or increase the number of scans and/or decrease the spacing between the scanning lines.

In order to carry out the second post-molding machining it is possible for example to use the same configuration, but with a scanning speed lower by at least one order of magnitude, so that the power supplied per unit area increases to such a level as to be capable of also degrading the structural fiber; for example:
  Scanning speed: 400 mm/s Preferably, for both machinings the scanning direction of the laser beam on the region to be treated is in the direction that allows the minimum stroke of the laser beam. This allows the machining times to be minimized and allows a more controllable relative movement between braking area and source. In the second machining (making the grooves), therefore, the preferred scanning direction is that of the width L1 of the grooves.

For example, in the case of the preferred configuration of annular braking area and grooves extending in the radial direction, the scanning of the laser beam takes place in the radial direction in the first machining (machining of the entire brake track or of one or more regions thereof, for example sectors of an annulus) and in the circumferential direction in the second machining (making the grooves).

Through a high-energy beam it is also possible to carry out the two post-molding machinings at the same time, for example by changing the scanning times so that the beam dwells for longer where it has to remove the structural fiber.

As an alternative to a laser beam, for the first post-molding machining it is possible to use a jet of atmospheric plasma. In this case, the machining is very homogeneous and the scanning lines are not visible, that are on the other hand visible in the case of laser. On the other hand, the costs are greater and the source adapts poorly, if at all, to the second machining.

The source of the high-energy beam is advantageously a computer numerical control (CNC) machine.

In an embodiment, a machine is used having a motorized chuck to drive the wheel component into rotation.

The above is a description of various embodiments of inventive aspects, and further changes can be made without departing from the scope of the present invention. The shape and/or size and/or location and/or orientation of the various components can be changed. The functions of a component can be carried out by two or more components and vice-versa. Components shown directly connected to or contacting each other can have intermediate structures arranged between them. The details shown in a figure and/or described with reference to a figure or to an embodiment can apply in other figures or embodiments. Not all of the details shown in a figure or described in a same context have to necessarily be present in a same embodiment. Features or aspects that turn out to be innovative with respect to the prior art, alone or in combination with other features, should be deemed to be described per se, irrespective of what is explicitly described as innovative.

What is claimed is:

1. Process for manufacturing a bicycle wheel component, comprising the steps of:
   a) providing a bicycle wheel component having at least one braking area configured to cooperate with a braking body, said braking area being made by molding of composite material comprising structural fibers incorporated in a polymeric material, and
   b) carrying out post-molding machining of at least one region of said at least one braking area, comprising the steps of:
   b1) removing only polymeric material, without removal of the structural fiber, from the entire region so that said at least one braking area comprises a surface layer defined by the polymeric material and protruded portions of structural fibers that project beyond the surface layer, and
   b2) removing the structural fiber according to at least one groove within the region.

2. Process according to claim 1, wherein step b2) takes place according to a pattern of grooves.

3. Process according to claim 1, wherein step b2) is subsequent to step b1).

4. Process according to claim 1, wherein step b1) and/or step b2) are made by pyrolysis through a laser beam in the near infrared.

5. Process according to claim 4, wherein step b1) and step b2) are carried out by pyrolysis through laser beams emitted by a same laser source, by varying at least one of: the emitted power, the emission frequency of pulses in the case of a pulsed source, the number of scans of the region, the spacing between scanning lines.

6. Process according to claim 1, wherein in step b1) at least 60% of polymeric material is removed.

7. Process according to claim 1, wherein step b2) is carried out so that the cut structural fibers represent no more than 9% of the surface of the braking area.

8. Process according to claim 1, wherein step b2) further comprises removing the polymeric material according to the at least one groove within the region.

9. Process according to claim 7, wherein step b2) is carried out so that the cut structural fibers represent 5% of the surface of the braking area.

10. Process for manufacturing a bicycle wheel component, comprising the steps of:
    a) providing a bicycle wheel component having at least one braking area configured to cooperate with a braking body, said braking area being made by molding of composite material comprising structural fibers incorporated in a polymeric material, and
    b) carrying out post-molding machining of at least one region of said at least one braking area, comprising the steps of:
    b1) removing only polymeric material, without removal of the structural fiber, from the entire region so that the structural fiber outcrops at least in part from the polymeric material, and
    b2) removing the structural fiber according to at least one groove within the region,
    wherein step b1) and step b2) are carried out by pyrolysis through laser beams in the near infrared emitted by a same laser source, by varying at least one of: the emitted power, the emission frequency of pulses in the case of a pulsed source, the number of scans of the region, the spacing between scanning lines.

11. Process according to claim 2 wherein the pattern of grooves is formed as discrete grooves.

* * * * *